Patented Nov. 29, 1938

2,138,559

UNITED STATES PATENT OFFICE 2,138,559

DIAZO COMPOUNDS AND PROCESS OF MAKING SAME

Fritz Straub and Peter Pieth, Basel, and Hermann Schneider, Riehen, Switzerland, assignors to the firm Society of Chemical Industry in Basle, Basel, Switzerland No Drawing. Application May 12, 1937, Serial No. 142,280. In Switzerland May 14, 1936

5 Claims. (Cl. 260—141)

This invention relates to the manufacture of diazo-compounds of 2-amino-1-hydroxynaphthalene sulfonic acids containing nitro-groups by treating with a nitrating agent a diazo-compound of 2-amino-1-hydroxynaphthalene sulfonic acid of the general formula:

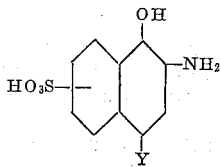

wherein Y represents hydrogen or a sulfonic acid group.

Diazo compounds of bodies of the above general formula are, for example, diazo-compounds of 2-amino-1-hydroxynaphthalene-6- or -7- or -8-sulfonic acid or of 2-amino-1-hydroxynaphthalene-4,6- or 4,7- or -4,8-disulfonic acid.

As nitrating agents for nitrating these diazo compounds there may be used for example nitric acid, mixtures of nitric acid and indifferent solvents such as for example glacial acetic acid, a mixed acid, i. e. a mixture of nitric acid and sulfuric acid, as well as mixtures of sulfuric acid and salts of nitric acid, for example potassium nitrate or sodium nitrate. The reaction between the nitrating agent and the diazo compound is preferably carried out at low temperature, for example between 0-20° C. When the diazo-compound of 2-amino-1-hydroxynaphthalene sulfonic acid in which Y is a sulfonic acid group is treated with the nitrating agent the sulfonic acid group in 4-position is exchanged for a nitro-group.

The diazo-compounds of 2-amino-1-hydroxynaphthalene sulfonic acids containing nitro-groups made in accordance with this invention are valuable intermediate products.

The following examples illustrate the invention the parts being by weight:—

Example 1

25 parts of diazotized 2-amino-1-hydroxynaphthalene-6-sulfonic acid, made by diazotizing the 2-amino-1-hydroxynaphthalene-6-sulfonic acid obtainable as described in British Patent No. 451,578 are introduced at 10-15° C. into 80 parts of concentrated sulfuric acid. When the whole has become a uniform magma it is cooled to 0° C. and at this temperature a mixture of 11 parts of nitric acid of 60 per cent. strength and 22 parts of sulfuric acid monohydrate is added by drops. Stirring for 4 hours at 0-15° C. follows and the mass is then poured upon ice and the nitrated diazo-compound of 2-amino-1-hydroxynaphthalene-6-sulfonic acid is salted out with excess of potassium chloride. In this way there is obtained a yellow paste which is soluble in water.

2-amino-1-hydroxynaphthalene-6-sulfonic acid may be diazotized as follows:—24 parts of the sulfonic acid are suspended in 100 parts of water and the suspension is mixed with a solution of 0.5 part of crystallized copper sulfate in 10 parts of water. This mixture is diazotized at 10-15° C. by means of a solution of 7 parts of sodium nitrite in 20 parts of water. The diazo-compound is salted out with common salt, filtered and dried.

Example 2

25 parts of diazotized 2-amino-1-hydroxynaphthalene-7-sulfonic acid are introduced into 70 parts of concentrated sulfuric acid. Into this suspension cooled to 0° C. there is introduced by drops a mixture of 11 parts of nitric acid of 60 per cent. strength and 22 parts of sulfuric acid monohydrate and the whole is stirred for 5 hours at 5-15° C. The mass is then poured upon 300 parts of ice and the nitrated diazo-compound is salted out with common salt. It is a bright yellow paste which is freely soluble in cold water.

2-amino-1-hydroxynaphthalene-7-sulfonic acid may be diazotized by suspending 239 parts in 800 parts of water, then adding a concentrated solution containing 5 parts of crystallized copper sulfate and diazotizing at 10-20° C. by means of a solution of 69 parts of sodium nitrite and 250 parts of water. The diazo-compound is salted out with common salt.

Alternatively the diazotization may be conducted in presence of sulfuric acid of 10 per cent. strength without the addition of copper sulfate.

Example 3

250 parts of finely powdered diazotized 2-amino-1-hydroxynaphthalene-8-sulfonic acid, made by diazotizing the 2-amino-1-hydroxynaphthalene-8-sulfonic acid obtainable as described in British Patent No. 451,478, are introduced at ordinary temperature into 900 parts of concentrated sulfuric acid. The viscid mass is cooled to 0-5° C. and at this temperature there is run in a cooled mixture of 110 parts of nitric acid of 60 per cent. strength and 200 parts of sulfuric acid monohydrate. The whole is stirred for 2 hours at 0-5° C., for a further hour at 5-10° C. and for yet another hour at 10-15°. The mass is then poured on to 3000 parts of ice and the nitrated diazo-compound is salted out. It is a yellow to yellow-brown paste, rather freely soluble in water.

The 2-amino-1-hydroxynaphthalene-8-sulfonic acid may be diazotized by suspending 239 parts of it in 600 parts of water and mixing the suspension with a solution of 2 parts of crystallized copper sulfate in 10 parts of water. Into this suspension cooled to 8–12° C. there is run in the course of a short time a solution of 69,8 parts of sodium nitrite in 140 parts of water. When the diazo-compound has been formed it is filtered and dried cautiously in a vacuum at 40–45° C.

*Example 4*

330 parts of sharply dried diazotized 2-amino-1-hydroxynaphthalene-4,6-disulfonic acid are introduced at 7–10° C. into 900 parts of sulfuric acid monohydrate while stirring well. There is then allowed to run gradually into the mass at 5–10° C. 175 parts of mixed acid containing 48 per cent. of nitric acid and 100 parts of sulfuric acid monohydrate and the temperature is finally kept at 10–12° C. for 2–3 hours. This nitration mixture is then mixed with a little ice while externally cooling, whereby the diazo-compound of the 4-nitro-2-amino-1-hydroxynaphthalene-6-sulfonic acid is in greater part separated in the form of a greenish yellow precipitate. From the filtrate a further quantity of the diazo-compound may be obtained by neutralizing the acid solution with sodium carbonate.

*Example 5*

330 parts of dry diazotized 2-amino-1-hydroxynaphthalene-4,7-disulfonic acid are introduced at 8–10° C. into 1000 parts of sulfuric acid monohydrate and after stirring well there are run in at 5–10° C. 175 parts of a mixed acid of 48 per cent. strength diluted with 120 parts of sulfuric acid monohydrate. The mass is further stirred at 10–15° C. for 2–3 hours and after cooling to 5° C. the nitrating mixture is poured on to a little ice. The diazo-compound of the 4-nitro-2-amino-1-hydroxynaphthalene-7-sulfonic acid which has been formed is thus in part separated in the form of a greenish yellow precipitate. An approximately complete separation in the form of green yellow laminae is obtained by cautiously neutralizing the nitrating mixture with sodium carbonate; there then remains in the solution only some unchanged parent material.

*Example 6*

330 parts of dry diazotized 2-amino-1-hydroxynaphthalene-4,8-disulfonic acid are introduced at 8–10° C. into 700 parts of sulfuric acid monohydrate. The mixture is cooled while stirring to 5° C. and at 5–10° C. there is added by drops a mixture of 140 parts of mixed acid containing 48 per cent. of nitric acid with 150 parts of sulfuric acid monohydrate. After stirring for 1 hour the paste is added to ice whereupon the diazotized 4-nitro-2-amino-1-hydroxynaphthalene-8-sulfonic acid separates in the form of a fine bright yellow precipitate. This is filtered and washed with a solution of common salt of 10 per cent. strength.

What we claim is:—

1. Process for the manufacture of nitro-substituted diazo-compounds of 2-amino-1-hydroxynaphthalene sulfonic acids, consisting in causing nitrating agents to react with the diazo-compounds of 2-amino-1-hydroxynaphthalene sulfonic acids of the general formula

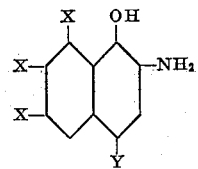

wherein one X stands for a sulfonic group, the other two X's stand for hydrogen and wherein Y is a member of the group consisting of H and SO₃H.

2. Process for the manufacture of nitro-substituted diazo-compounds of 2-amino-1-hydroxynaphthalene sulfonic acids, consisting in causing a mixture of nitric acid and sulfuric acid to react with the diazo-compounds of 2-amino-1-hydroxynaphthalene-sulfonic acids of the general formula

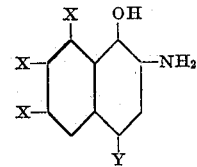

wherein one X stands for a sulfonic group, the other two X's stand for hydrogen and wherein Y is a member of the group consisting of H and SO₃H.

3. Process for the manufacture of nitro-substituted diazo-compounds of 2-amino-1-hydroxynaphthalene sulfonic acids, consisting in causing a mixture of nitric acid and sulfuric acid to react with the diazo-compounds of 2-amino-1-hydroxynaphthalene sulfonic acids of the general formula

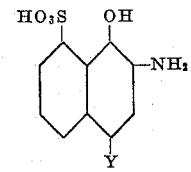

wherein Y is a member of the group consisting of H and SO₃H.

4. Diazo compounds from amines of the general formula

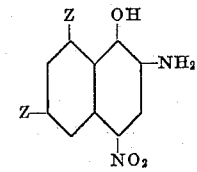

wherein one Z stands for a sulfonic acid group and the other Z stands for hydrogen.

5. Diazo compounds from the amine of the formula

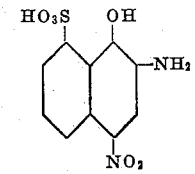

FRITZ STRAUB.
PETER PIETH.
HERMANN SCHNEIDER.